US008727237B2

(12) United States Patent
Natterer

(10) Patent No.: US 8,727,237 B2

(45) Date of Patent: May 20, 2014

(54) WATER CONSERVING ADJUSTABLE SPRINKLER SYSTEM

(76) Inventor: Mark R. Natterer, Lebanon, OR (US)

( * ) Notice: Subject to any disclaimer, the term of this patent is extended or adjusted under 35 U.S.C. 154(b) by 536 days.

(21) Appl. No.: 12/800,620

(22) Filed: May 18, 2010

(65) Prior Publication Data

US 2011/0284663 A1 Nov. 24, 2011

(51) Int. Cl.

| | |
|---|---|
| ***A01G 1/12*** | (2006.01) |
| ***A01G 25/00*** | (2006.01) |
| ***A01G 25/16*** | (2006.01) |

(52) U.S. Cl.

USPC ............ 239/265; 239/242; 239/243; 239/550

(58) Field of Classification Search

USPC .............. 239/225.1, 237, 240, 242, 243, 265, 239/159, 160, 161, 162, 163, 164, 176, 550, 239/551, 565

See application file for complete search history.

(56) References Cited

U.S. PATENT DOCUMENTS

| | | | | |
|---|---|---|---|---|
| 14,437 | A * | 3/1856 | Blake | 239/565 |
| 1,011,934 | A * | 12/1911 | Fellows | 239/240 |
| 1,363,720 | A * | 12/1920 | Cooper | 239/536 |
| 2,597,727 | A * | 5/1952 | Hanson | 239/164 |
| 3,827,634 | A * | 8/1974 | Hammelmann | 239/227 |
| 4,010,898 | A | 3/1977 | Williams | |
| 4,778,111 | A | 10/1988 | Leap | |
| 4,852,802 | A * | 8/1989 | Iggulden et al. | 239/64 |
| 5,285,968 | A | 2/1994 | McSheehy | |
| 5,642,861 | A * | 7/1997 | Ogi et al. | 239/568 |
| 7,090,146 | B1 * | 8/2006 | Ericksen et al. | 239/200 |
| 2008/0035766 | A1 * | 2/2008 | Belz | 239/726 |

* cited by examiner

*Primary Examiner* — Justin Jonaitis

(74) *Attorney, Agent, or Firm* — Teri G. Andrews; Patent Attorney

(57) ABSTRACT

An adjustable sprinkler system distributes water from a garden hose through a feed housing to a pair of pivotally attached arms. There is a sprinkler unit attached near the end of each arm. Each sprinkler unit has an interchangeable spray head attached that is specific to the desired watering pattern. By pivoting the arms away from one another, the sprinkler system is placed on either side of the base of the shrub or tree to be watered. This adjustable sprinkler system accommodates newly planted and existing small to large and short to tall trees and shrubs, provides a multitude of spray patterns at varying water volumes, and minimizes water waste.

17 Claims, 11 Drawing Sheets

WATER CONSERVING ADJUSTABLE SPRINKLER SYSTEM

FIELD OF THE INVENTION

The present invention relates, in general, to devices for watering fruit tree, trees, and plants and, more particularly, to adjustable sprinkler systems for controlled, water saving distribution of water onto both newly planted and existing varying sized trees and plants.

BACKGROUND OF THE INVENTION

There are various ideas on how a tree should be watered, but the main theme that most experts agree on is that a tree should be watered deeply rather than frequently. Water should be kept away from the base of the tree and water should not spray onto the fruit or leaves of the tree. Water that is sprayed onto the leaves and fruit can increase the chance of various types of mildew, fungal and bacterial problems. If the soil becomes too wet at the base of the tree it can cause soil-born fungal diseases such a crown rot.

Currently, there are many ways to water various plants, shrubs, fruit trees and trees. Rotary sprinklers, which are mainly used for watering lawns and gardens, are designed to operate at medium to high water volumes. If the water volume is turned down too low, most of the rotary designed sprinklers will not operate properly and will have a tendency to stall in one position and not rotate back and forth. This can be a problem when watering newly planted trees which need water in a small contained area at low volumes.

Oscillating sprinklers are generally designed to be used for lawns and gardens, and most do not operate at low water volumes. Oscillating sprinklers typically shoot volumes of water in both an upward and outward pattern in order to cover large areas. Often this method of watering sprays water on the fruit and leaves of trees and shrubs increasing the risk of fungal diseases.

Dropping a garden hose near the base of a tree and turning the faucet to a very low water volume is especially common when watering newly planted and young trees. However, often the water is concentrated on one side of the tree while the opposite side may lack the ideal amount of water. Irrigating a 360 degree zone around the tree is preferable as it encourages root growth in all directions.

Another popular method of watering is the soaker hose. This method entails wrapping the hose in a spiral pattern around the base of the tree. This may not be a concern for a single tree, however, when one has many trees to water it can be a time consuming event to unwrap the soaker hose from one tree and wrap it around the next. Another disadvantage is, as the tree grows, more and more soaker hose is required to effectively reach the areas that need to be watered. With newly planted trees, shrubs or plants it can be difficult to purchase a standard length soaker hose that is short enough to accommodate the limited area that needs to be watered. If the soaker hose is too long, too many wraps around in a tight area can apply water too quickly and cause water waste due to run off or the wraps can extend too far outside the root ball system which will not benefit the tree and result in water waste. When mowing the lawn, it is prudent to unwrap the soaker hose from around the tree so the hose does not get caught in the mower blades. This is both laborious and time consuming as the hose will have to be wrapped back around the tree after mowing. Grass around the tree can also be damaged if the soaker hose is left for a long period of time leaving an unsightly spiral imprint in the grass when the hose is removed.

A common solution to watering selected plants or areas are the low volume drip/sprinkler systems. For example, RainBird® makes an array of low volume drip/sprinkler systems that are attachable to a garden hose. The RainBird® systems and other low volume drip/sprinkler systems have a variety of low water volume emission devices or spray heads available such as full/half/quarter circle, strip patterns, and the like. Typically these units are on a long length of thin, plastic tubing lying within landscaping with the desired spray heads inserted into the tubing near plants or shrubs. Once in position, they are not easily moved and are crushed or severed if ran over by a mower.

In the case of a tree, a low volume system such a RainBird® drip/sprinkler system may be useful during the youth of the tree as these systems produce a very low volume spray and are somewhat adjustable to avoid spraying the tree. However, as the tree matures and a larger watering pattern is needed, these low volume systems cannot spray a pattern large enough to efficiently water a mature tree. The low volume sprinkler system has to be removed and replaced with a sprinkler system capable of producing a larger spray pattern at higher water volumes to support a mature tree. This becomes very costly as well as time consuming.

U.S. Pat. No. 4,010,898 issued to Williams, discloses a semi-permanent, semi-looped conduit that has multiple spray nozzles along the conduit for distributing liquid outward from the plant/tree in a fan-like overlapping pattern. One issue with this configuration is that the spray nozzles do not spray a narrow pattern or oscillate back and forth allowing the water time to soak into the ground before the next pass. Additionally, there is no option of interchangeable spray heads to accommodate different soil types and watering requirements of the plant or there. Williams has no method of controlling or adjusting the watering zones around the tree and there is no easy method of shutting off any of the spray nozzles to accommodate areas that may not require irrigation. Even though Williams' system eliminates the wrapping issues of the soaker hose method, it has no variability with respect to plant/tree trunk size; therefore it is optimal for only one size or variety of tree.

U.S. Pat. No. 4,778,111 issued to Leap, makes another attempt to improve the soaker hose idea with two tubular arms (short lengths of soaker hose) that wrap around a tree. Although this can reach around a large tree as well as around a smaller tree, with a small tree there will be considerable overlap of the two tubular arms creating one extremely wet side as there will be double watering on one side. Leap discloses no means of watering zone control such as the ability to shut off one or more of the spray nozzles for areas that may not require irrigation or overlap. There is no option for modifying the spray nozzle function to accommodate different soil types and watering requirements of the plant or tree. The spray pattern also shows that it will likely spray onto the trunk area which can cause some types of soil born fungal diseases to attack the base area of the tree. As in U.S. Pat. No. 4,010,898 issued to Williams, it does not have a single spray pattern that oscillates back and forth giving the ground time to soak in the water before the next pass of water is applied.

U.S. Pat. No. 5,285,968 issued to McSheehy, discloses a one-piece molded water chamber in the form of an annulus having a large open segment which permits the water chamber to surround the trunk of a tree for watering. Although McSheehy surrounds the trunk of a tree, it fails to provide any ability to efficiently adjust to watering varying tree sizes. As with Williams and Leap above, McSheehy has little or no adjustability with regard to spray head design and watering zone control.

Many people rely on their in-ground lawn sprinkler systems to not only water their grass but also their trees. Lawns require shallow watering, around six inches, and frequent irrigation. This is not always the best irrigation for trees. Trees and grass compete for the water that is applied. Since most in-ground systems are set up to only apply enough water to keep grass healthy, both the grass and tree are not supplied with enough irrigation. Increasing in-ground irrigation in the zones that have trees, increases water costs and water waste. Additionally, most in-ground systems are broken into watering zones. Each zone can contain many sprinkler heads and each zone is controlled by the same timer and on/off valve. This makes it difficult to apply water only in the areas that benefit the tree without over-watering the other areas within the zone. Unlike grass, trees should be watered less frequently and at a depth of at least eighteen inches.

There is a need for a sprinkler system that can easily be placed around variable sized trees, applies water at an even, adjustable rate 360 degrees around the tree, and is able to irrigate to a depth that is healthy for any variety or size of tree. Additionally, the desired sprinkler system needs to accommodate low volume as well as high volume watering needs while avoiding excessive watering and runoff. This sprinkler system needs to accomplish all of this while conserving water and being beneficial for both the tree and the surrounding grass.

SUMMARY OF THE INVENTION

It is the object of the present invention to provide an adjustable, low to high volume sprinkler system for watering newly planted and existing small to large fruit trees, trees, shrubs, or the like. It is another object of the present invention to conserve water while providing the necessary water to maintain and grow healthy trees and other plants. It is a further object of the present invention to provide a versatile and portable system that is capable of allowing a selection of unique spray heads that can water newly planted small, medium, and large trees, shrubs, plants and fruit trees in a 360 degree pattern which will encourage root growth in all directions. The interchangeable spray heads offer an array of watering spray patterns at various water volumes accommodating different soil types and watering needs of the tree or plant while minimizing overwatering and water waste.

The water conserving adjustable sprinkler system of the present invention distributes water from a garden hose through a feed housing to a pair of pivotally attached arms. There is a sprinkler unit attached near the end of each arm. Each sprinkler unit has an interchangeable spray head attached that is specific to the desired watering pattern. By pivoting the arms away from one another, the sprinkler system is placed on either side of the base of the shrub or tree to be watered. This adjustable sprinkler system accommodates newly planted and existing small to large and short to tall trees and shrubs, provides a multitude of spray patterns at varying water volumes, and minimizes water waste.

BRIEF DESCRIPTION OF THE DRAWINGS

The above description and other objects, advantages, and features of the present invention will be more fully understood and appreciated by reference to the specification and accompanying drawings, wherein.

DRAWING ELEMENT NUMBERS

100 Adjustable Sprinkler System
102 Pivot Water Feed Housing
104 First Arm
106 Second Arm
108 First Spray Head
110 Second Spray Head
112 Optional Fertilizer Dispenser
114 Optional Timer
116 Main Flow Control
118 First Head Flow Adjustment
120 Second Head Flow Adjustment
122 Adjustment Angle
124 First Sprinkler Unit
126 Second Sprinkler Unit
128 First Adjustable Zone Stops
130 Second Adjustable Zone Stops
132 Hose Fitting
133 Water Input Port
136 First Pivot Arm Support
138 Second Pivot Arm Support
202 Water Channel
204 First Pivot Arm Feed
206 Second Pivot Arm Feed
208 Water
304 Head Interchange Release
308 Nozzles
400 Large Tree Irrigation Pattern
402 First Irrigation Zone
404 Second Irrigation Zone
406 No Irrigation Zone
408 Overlap Zones
410 First Spray Pattern
412 Second Spray Pattern
414 Tree Base
500 Small Tree Irrigation Pattern
506 Water Nozzle Deflectors
508 Alternate $1^{st}$ Spray Head
510 Alternate $2^{nd}$ Spray Head
512 Alternate $2^{nd}$ Spray Pattern

514 Alternate $1^{st}$ Spray Pattern
516 Small Tree Base
602 Irrigation Area
604 Root Ball
704 Nozzle Inserts
800 Open Water Feed Port
802 Offset Water Velocity Reduction Feed Port
804 Water Chamber
900 Low to High Volume Spray Head
902 Single Full Coverage Nozzle
1000 Medium Volume Spray Head
1002 Non-Offset Nozzle Inserts
1102 First Universal Fitting
1106 Second Universal Fitting
1108 First Arm Flow Control
1110 Second Arm Flow Control

DETAILED DISCUSSION OF THE PREFERRED EMBODIMENTS

Referring to the figures, like elements retain their indicators throughout the several views.

Figure 1:
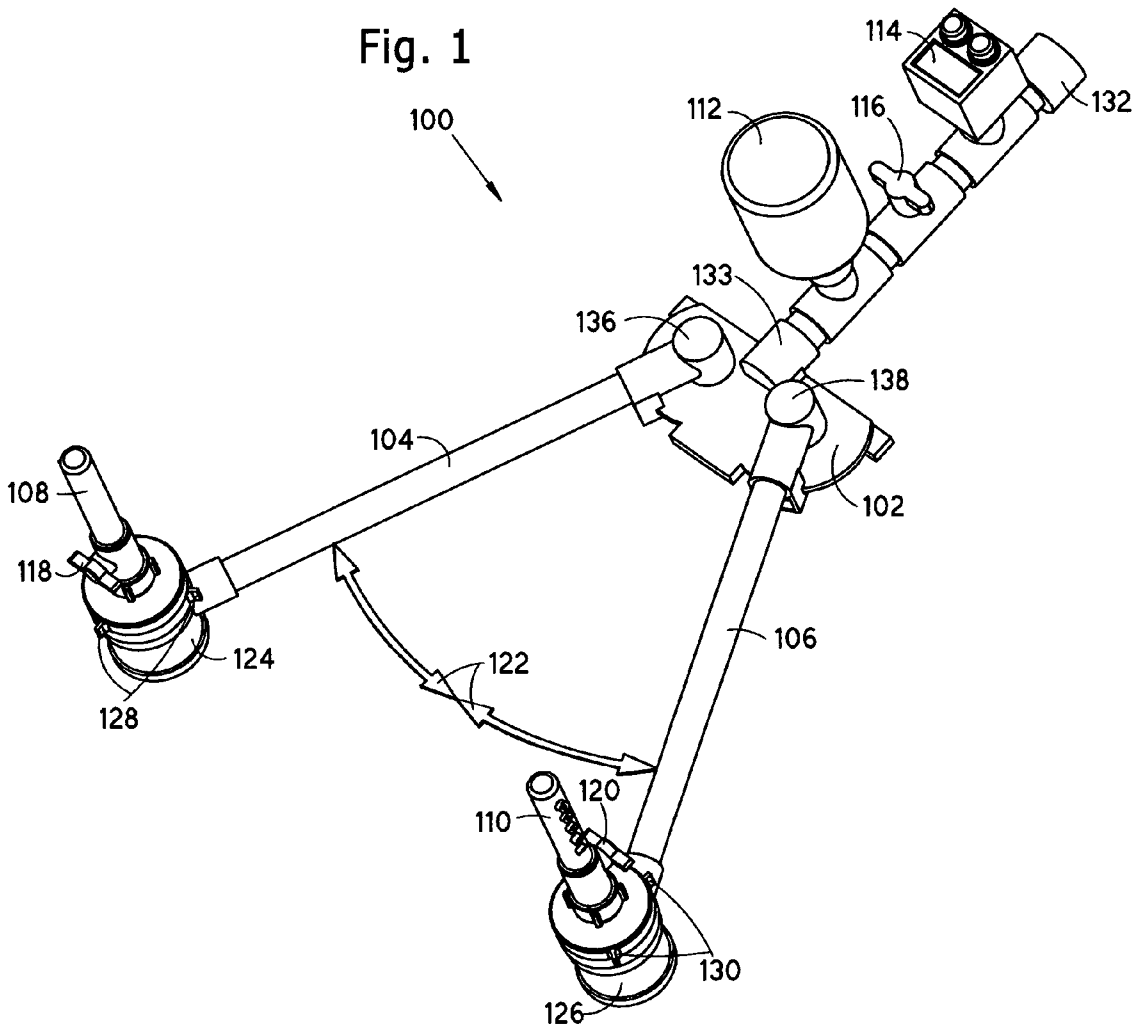
FIG. 1 is a perspective view of the adjustable sprinkler system of the present invention.

FIG. 1 is a perspective view of Adjustable Sprinkler System 100 of the present invention. Pivot Water Feed Housing 102 is a somewhat hollow housing made of a rigid material such as plastic. Pivot Water Feed Housing 102 has a First Pivot Arm Support 136 pivotally attached to the top surface. First Arm 104 is a section of rigid tubing that extends from First Pivot Arm Support 136 and has First Sprinkler Unit 124 attached opposite First Pivot Arm Support 136.

First Sprinkler Unit 124 is a common sprinkler unit for use with this system which does not encompass any new technology rather uses the basic technology seen in common rotary and oscillating sprinklers currently on the market. Most rotary and oscillating sprinklers use a water turbine and gear reduction system with an over pressure valve and direction shift valve. In this preferred embodiment, First Adjustable Zone Stops 128 are tabs on rings that surround and slide around First Sprinkler Unit 124 and have corresponding internal tabs (not shown) that make contact with a direction shift valve and that limit the rotation of First Sprinkler Unit 124. For example, when First Adjustable Zone Stops 128 are slid to opposite sides of First Sprinkler Unit 124, First Spray Head 108 oscillates back and forth in its widest sweep. Conversely, when First Adjustable Zone Stops 128 are very close to one another, the sweep will be minimal. First Spray Head 108 oscillates between First Adjustable Zone Stops 128 when water flows into First Sprinkler Unit 124. First Spray Head 108 is attached to First Sprinkler Unit 124 and is essentially perpendicular to First Arm 104. First Head Flow Adjustment 118 is located between First Sprinkler Unit 124 and First Spray Head 108 and functions as both a shutoff valve and a flow adjustment.

Similarly, Second Pivot Arm Support 138 is pivotally attached to the top surface of Pivot Water Feed Housing 102. Second Arm 106 is a section of rigid tubing that extends from Second Pivot Arm Support 138 and has Second Sprinkler Unit 126 attached opposite Second Pivot Arm Support 138.

Similar to First Sprinkler Unit 124, Second Sprinkler Unit 126 is also a sprinkler unit that oscillates between Second Adjustable Zone Stops 130 when water flows into Second Sprinkler Unit 126. Second Spray Head 110 is attached to Second Sprinkler Unit 126 and is essentially perpendicular to Second Arm 106. Second Head Flow Adjustment 120 is located between Second Sprinkler Unit 126 and Second Spray Head 110 and functions as both a shutoff valve and a flow adjustment.

In the preferred embodiment of FIG. 1, First Sprinkler Unit 124 and Second Sprinkler Unit 126 are sprinkler units capable of operating at low to high water volumes unlike many of the common rotary and oscillating sprinkler units on the market today which are designed for medium to high water volumes. At low water volumes, these typical sprinkler units do not oscillate back and forth or rotate consistently and may even stall in one position due to the inadequate water pressure at low volumes.

First Sprinkler Unit 124 and Second Sprinkler Unit 126 do not encompass any new technology but use the basic technology seen in most of the rotary and oscillating sprinklers currently on the market with the added ability of the present invention to control flow into and out to First Sprinkler Unit 124 and Second Sprinkler Unit 126. Flow control allows First Sprinkler Unit 124 and Second Sprinkler Unit 126 to function reliably at low water volumes enabling the present invention to also water newly planted trees, shrubs, and plants that have a small root ball and need irrigation in a small or confined area without wasting water. In some cases, low water volume operation may also be desired due to specific tree, shrub, and plant watering needs or due to a specific soil condition. First Sprinkler Unit 124 and Second Sprinkler Unit 126 may vary in physical size such as height and diameter, however, what is shown in FIG. 1 is the preferred embodiment.

Water Input Port 133 is also attached to and in fluid communication with Pivot Water Feed Housing 102 and located between First Pivot Arm Support 136 and Second Pivot Arm Support 138. Hose Fitting 132 is a common male hose fitting that has threads that allow attachment to a common garden hose. Main Flow Control 116 is located between Hose Fitting 132 and Water Input Port 133 and functions as both a shutoff valve as well as a flow control valve for the overall sprinkler system.

In this preferred embodiment, Optional Timer 114 is placed in-line between Hose Fitting 132 and Main Flow Control 116 and also functions as a shutoff valve. If a certain period of time is desired for watering, Optional Timer 114 is set for that length of time and closes an internal valve (not shown) when Optional Timer 114 expires thereby ceasing the flow of water into Pivot Water Feed Housing 102.

Optional Fertilizer Dispenser 112 is shown between Main Flow Control 116 and Water input Port 133 for dispensing a desired fertilizer or additive into Adjustable Sprinkler System 100. It has been contemplated that Optional Fertilizer Dispenser 112 is a simple drip system such as those used for fertilizer and weed killer products that attach between a garden hose and a handheld spray nozzle. Fertilizer Dispenser 112 may also contain its own shutoff valve (not shown).

Between Hose Fitting 132, Main Flow Control 116, Optional Fertilizer Dispenser 112 and Water Input Port 133 are varying lengths of plastic pipe that keep all components in fluid communication with Pivot Water Feed Housing 102. It has also been contemplated to have a threaded Water Input Port 133 for direct connection to a garden hose with First Head Flow Adjustment 118 and Second Head Flow Adjustment 120 functioning as shutoff valves. It has also been contemplated to have a threaded Water Input Port 133 for direct connection to a garden hose with a Main Flow Control 116 placed in-line with the outlet of First Pivot Arm Support 136 and another Main Flow Control 116 in-line with the Second Pivot Arm Support 138. These two Main Flow Control valves would control the water flow to First Sprinkler Unit 124 and Second Sprinkler Unit 126 eliminating the need for the First Head Flow Adjustment 118 and the Second Head Flow Adjustment 120. Although shown in this preferred embodiment, Optional Fertilizer Dispenser 112, Main Flow Control 116, First Head Flow Adjustment 118, Second Head Flow Adjustment 120, and Optional Timer 114 are options that can or cannot be included in the system.

With Main Flow Control 116 in an open or somewhat open position, water flows into Water Input Port 133, through Pivot Water Feed Housing 102, splits into First Pivot Arm Support 136 and Second Pivot Arm Support 138, through First Arm 104 and Second Arm 106 respectively and finally into First Sprinkler Unit 124 and Second Sprinkler Unit 126.

First Sprinkler Unit 124 and Second Sprinkler Unit 126 operate independently and can be adjusted according to the area and pattern of water coverage desired. In some instances, it may be desirable to completely shut off either First Sprinkler Unit 124 or Second Sprinkler Unit 126. This is accomplished by turning either First Head Flow Adjustment 118 or Second Head Flow Adjustment 120 to an off position. Although shown in this preferred embodiment, First Head Flow Adjustment 118 and Second Flow Adjustment 120 are options and can or cannot be included with the system.

First Sprinkler Unit 124 produces a spray pattern that is adjustable in both width and depth. First Spray Head 108 is attached to First Sprinkler Unit 124 and oscillates between First Adjustable Zone Stops 128. First Adjustable Zone Stops 128 are adjacent to one another and surround the outer portion of First Sprinkler Unit 124. As previously discussed, the user can adjust First Adjustable Zone Stops 128 by simply rotating them around First Sprinkler Unit 124. For example, First Adjustable Zone Stops 128 are adjusted farther apart for a wider spray pattern while moving them closer together creates a narrower spray pattern. First Spray Head 108 and Second Spray Head 110 can also be rotated after being attached to First Sprinkler Unit 124 and Second Sprinkler Unit 126, to adjust for the angle change of Adjustment Angle 122.

First Head Flow Adjustment 118 and Second Head Flow Adjustment 120 also control the water spray pattern by allowing more or less water to flow from First Spray Head 108 and Second Spray Head 110. For example, with First Head Flow Adjustment 118 in the fully open position, the maximum amount of water enters First Spray Head 108 thereby emitting a longer or deeper spray pattern. Conversely, if a shorter spray pattern is desired, First Head Flow Adjustment 118 is adjusted to a more closed position. First Head Flow Adjustment 118 and Second Head Flow Adjustment 120 are optional.

Adjustment Angle 122 is increased by pivoting First Arm 104 and Second Arm 106 away from each other as both First Arm 104 and Second Arm 106 are pivotally attached to Pivot Water Feed Housing 102 at First Pivot Arm Support 136 and Second Pivot Arm Support 138 respectively. The ability to change Adjustment Angle 122 is especially important when watering newly planted trees. Most of the roots of newly planted trees are removed when the tree is extracted from the ground at the nursery. Typically the root ball extends only about a foot from the base of the tree. The easy adjustment of Adjustment Angle 122 allows the operator to close or decrease Adjustment Angle 122 so that First Spray Head 108 and Second Spray Head 110 are as close to the base of the tree as possible. This helps to apply water onto the limited root system of the newly planted tree.

Widening or narrowing Adjustment Angle 122 also changes the position of the spray pattern created by First Spray Head 108 and Second Spray Head 110. To adjust for this position change, the operator can manually adjust First Adjustable Zone Stops 128 and Second Adjustable Zone Stops 130 until the spray patterns of First Spray Head 108 and Second Spray Head 110 again evenly distribute water around the base of the tree. Typically, it is desirable to have the width of each spray pattern to slightly overlap. Another adjustment that is included to correct for the Adjustment Angle of 122 is that First Spray Head 108 and Second Spray Head 110 can be rotated 360 degrees by the user to correct for the Adjustment Angle 122 change. This can be done by rotating the spray head while connected to the sprinkler unit.

It has also been contemplated to have Adjustment Angle 122 fixed where it is not critical to change Adjustment Angle 122. For example, an established orchard where the desired watering pattern or zone is known, several sprinklers of similar sizes may be desired and the movement of First Arm 104 and Second Arm 106 would not be necessary. It has also been contemplated to replace First Sprinkler Unit 124 and Second Sprinkler Unit 126 with fixed spray heads eliminating the rotary mechanism. For example, each of the fixed spray heads would spray a pattern that completes a 360 degree irrigation pattern around the tree or the user could select a set of fixed spray heads for any irrigation angle around the tree that they desire.

Additionally, it has been contemplated to use DC battery operated or solar powered motors to rotate First Spray Head 108 and Second Spray Head 110 back and forth.

Figure 2:
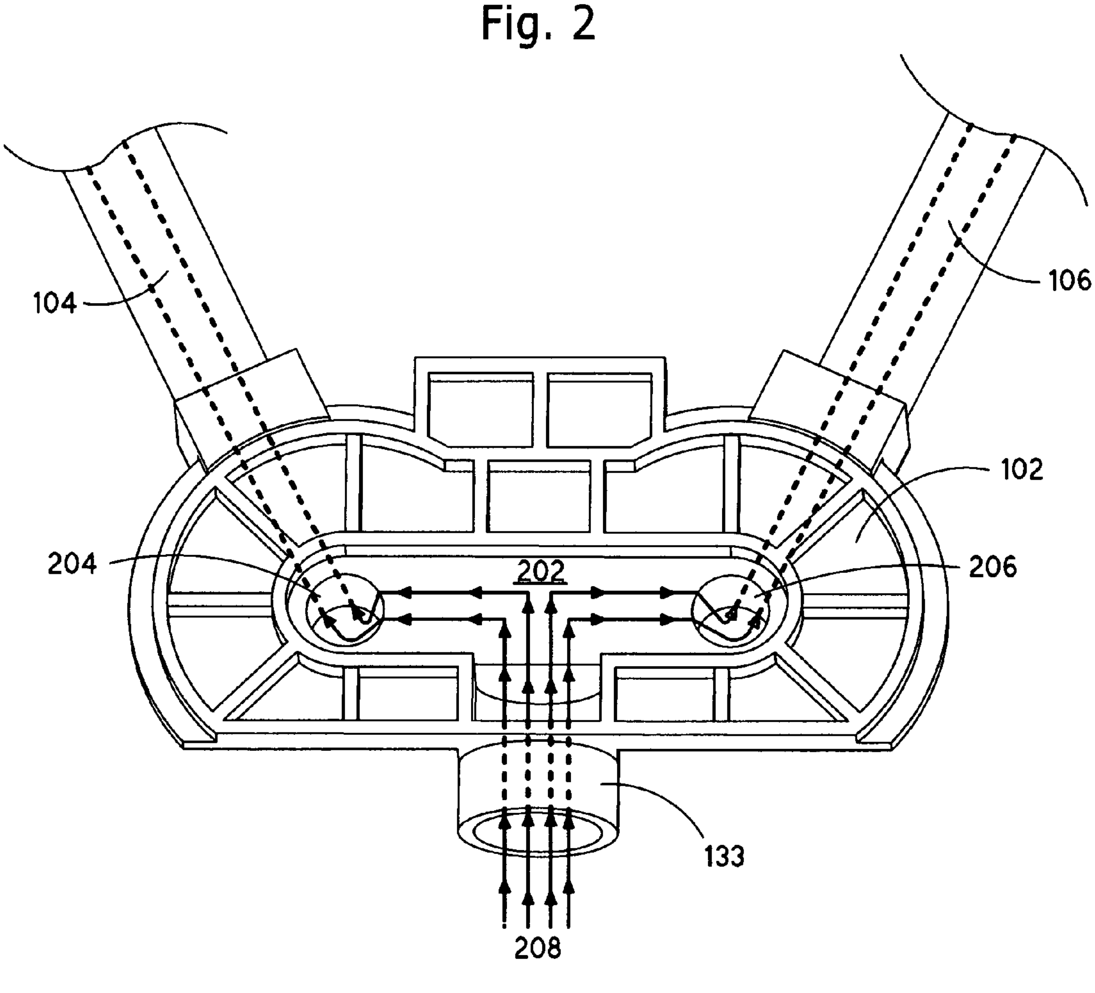
FIG. 2 is a bottom plan view of the pivot water feed housing of FIG. 1 with the bottom panel removed to illustrate the flow of water into and out of the pivot water feed housing.

FIG. 2 is a bottom plan view of Pivot Water Feed Housing 102 of FIG. 1 with the bottom panel removed to illustrate the flow of Water 208 into Pivot Water Feed Housing 102 and out to First Arm 104 and Second Arm 106. Water 208 enters Water Channel 202 through Water Input Port 133 and splits between First Pivot Arm Feed 204 and Second Pivot Arm Feed 206. The portion of Water 208 that ultimately goes to First Spray Head 108 and Second Spray Head 110 is controlled by the setting of First Head Flow Adjustment 118 and Second Head Flow Adjustment 120. For example, if First Head Flow Adjustment 118 is slightly closed while Second Head Flow Adjustment 120 is wide open, a larger portion of Water 208 will be delivered to Second Spray Head 110. Similarly, if both First Head Flow Adjustment 118 and Second Head Flow Adjustment 120 are set the same, Water 208 will be equally split between First Spray Head 108 and Second Spray Head 110. Main Flow Control 116 and the garden faucet can control water flow to Water Input Port 113 which would also control water flow to First Spray Head 108 and Second Spray Head 110.

The ability to control the distribution of Water 208 to First Spray Head 108 and Second Spray Head 110 is a valuable feature of the present invention as it can be useful when multiple Adjustable Sprinkler System 100 units are adjacent to one another. For example, a full spray pattern may not be desirable between sprinkler units as too much overlapping may occur resulting in overwatering. Overwatering is often both damaging to the tree or shrub and wastes valuable water. It is also a useful option when one side of the tree is near the house, sidewalk, driveway or patio and the user does not want water wasted by landing on the cement or hitting the side of the their home. The ability to control the water to First Spray Head 108 and Second Spray head 110 is also very helpful when the user does not want to encourage root growth in a certain direction due to sidewalks or homes. In this case, the user can simply turn down or completely shut off the water flow to a selected spray head.

Figure 3:
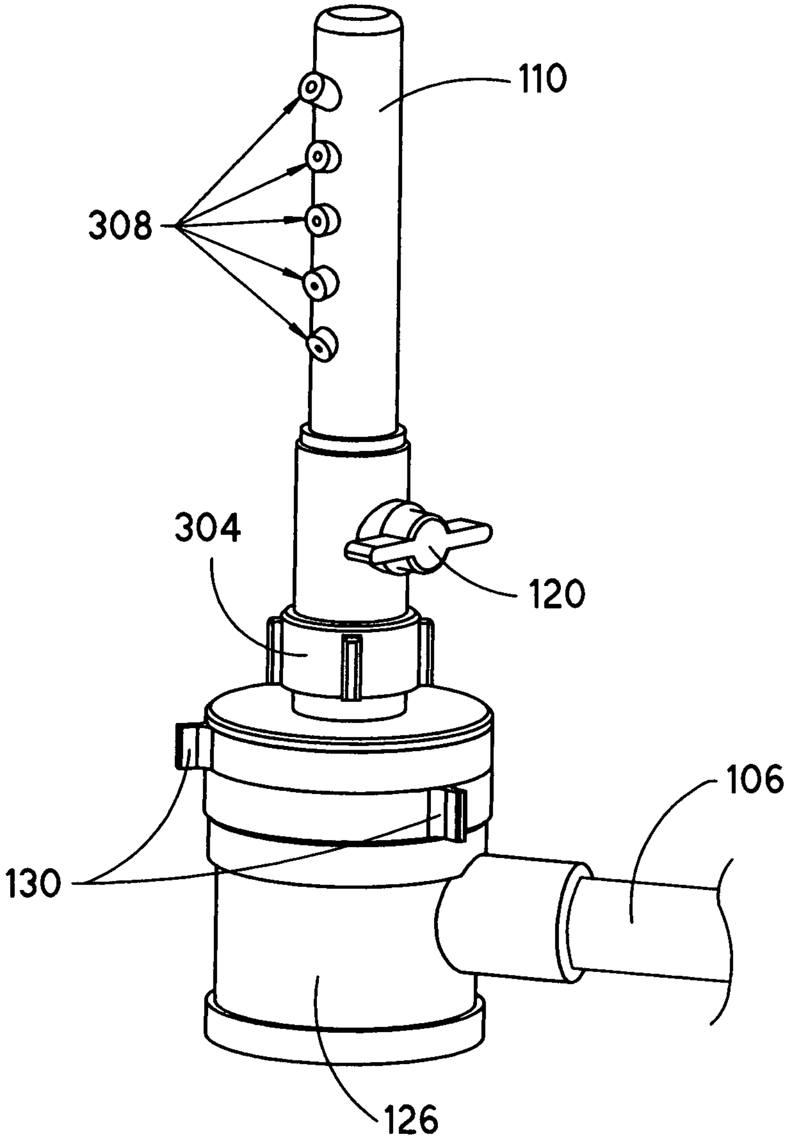
FIG. 3 is a perspective view of one of the sprinkler units of the present invention.

FIG. 3 is a perspective view of Second Sprinkler Unit 126 detailing the components of one of the two sprinkler units of the present invention. First Sprinkler Unit 124 is essentially the same, therefore, follows the same description and functionality.

In this embodiment, Second Spray Head 110 is an interchangeable spray head and is attached to Second Sprinkler Unit 126 by Spray Head Interchange Release 304. The interchangeable spray heads provide the user with a variety of water spray patterns. The spray heads contain permanent or insertable spray nozzle jets and can contain one or many nozzle jets. The nozzle port shape can be round, oval or a variety of different geometries. The inside diameter or shape of the nozzle's port can also vary to control water flow volume. Spray nozzles can also contain a water restriction insert that is inserted into the bottom of the spray head to allow better flow control to the nozzles. This selection of options allows the user to select the correct spray head and nozzles to accommodate various soil conditions as well as the various watering requirements of newly planted or established fruit trees, trees, shrubs or plants.

In this embodiment, Second Spray Head 110 has five permanent Nozzles 308 dispensed along one side. Water 208 (not shown) enters Second Sprinkler Unit 126 through Second Arm 106 and ultimately creates a spray pattern dictated by the shape, inside diameter, and number of Nozzles 308. As previously discussed, Second Spray Head 110 will oscillate between Second Adjustable Zone Stops 130.

Figure 4:
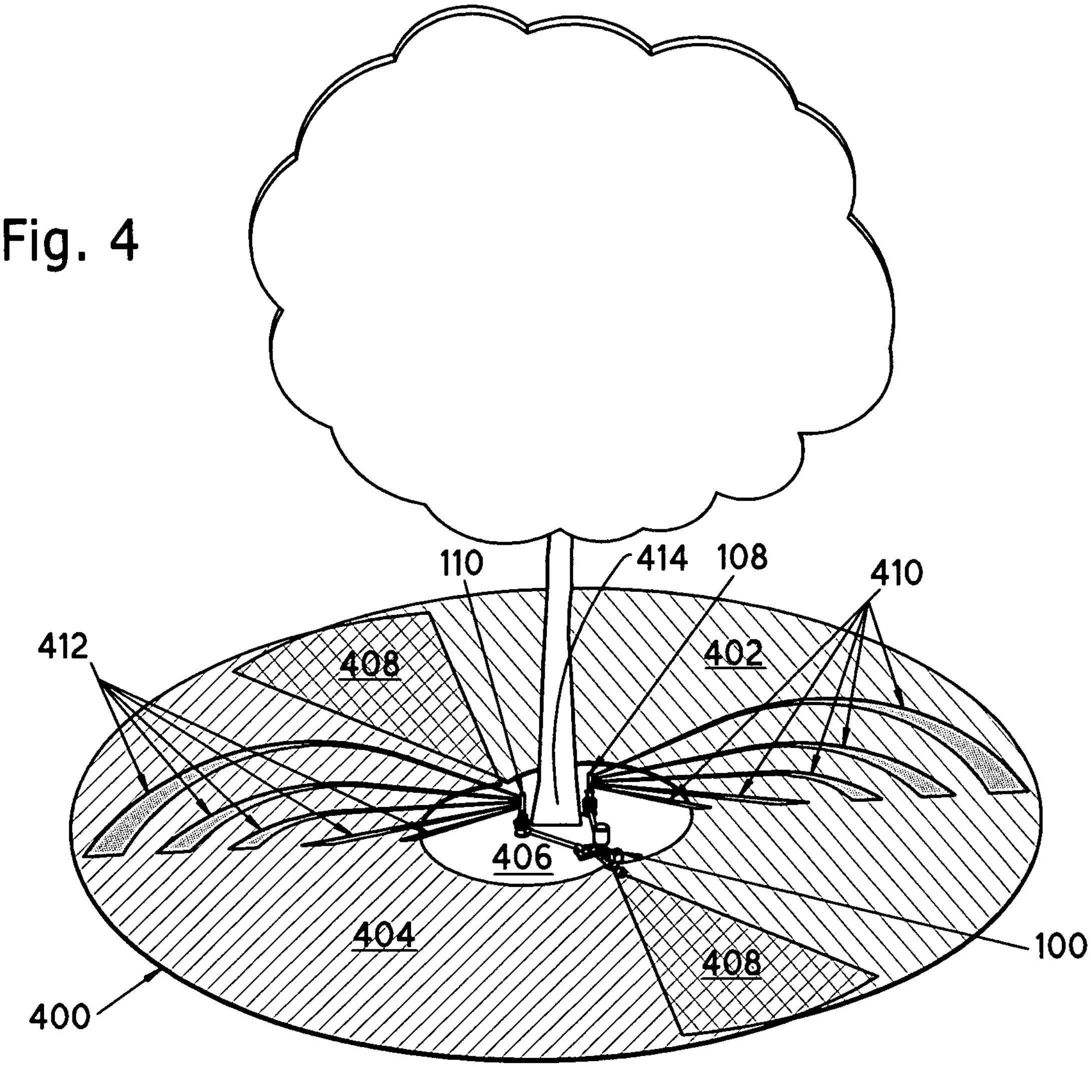
FIG. 4 is a perspective view of the adjustable sprinkler system of the present invention as applied to the irrigation of a large tree.

FIG. 4 is a perspective view of Adjustable Sprinkler System 100 of the present invention as applied to the irrigation of a large tree. Large Tree Irrigation Pattern 400 is created by positioning Adjustable Sprinkler System 100 near Tree Base 414 and spreading First Spray Head 108 and Second Spray Head 110 apart such that they are centered on opposite sides of the Tree Base 414.

In FIG. 4, both First Spray Head 108 and Second Spray Head 110 have five Nozzles 308 dispensing First Spray Pattern 410 and Second Spray Pattern 412 respectively. As water is applied, First Spray Head 108 creates First Irrigation Zone 402 while Second Spray Head 110 creates Second Irrigation Zone 404. Overlap Zone 408 is created on either side of the tree and is typically adjusted using the adjustable zone stops to minimize or exclude the overlap zone to avoid water waste due to water runoff and overwatering.

Although Large Tree Irrigation Pattern 400 shown in FIG. 4 extends beyond the large tree and its branches, First Spray Pattern 410 and Second Spray Pattern 412 maintain a low profile so spraying water does not contact the leaves or fruit of the tree. It is important to keep the water off the tree's leaves and fruit to discourage development of disease and fungal infections.

First Spray Head 108 and Second Spray Head 110 are positioned and throughput adjusted to create No Irrigation Zone 406. No Irrigation Zone 406 is created to avoid the soil becoming too saturated near Tree Base 414. Too much water near Tree Base 414 can created an environment that increases the chance of the tree being infected by a soil born fungal disease. The spray pattern of First Spray Head 108 and Second Spray Head 110 is designed to water in a pattern similar to a soaker hose. Nozzles 308 of the present invention are designed to not water in the area of No Irrigation Zone 406 and spray a pattern that sends out five different sprays that leave unwatered gaps between the spray areas where minimal water will land. This is done so that as the ground areas that are watered start to saturate with water, the water that is not soaking into the ground will start to spread out onto the surface of the ground in the areas between the spray that was not water. This water migration will soak into the unwatered band areas eventually soaking the entire area within the spray pattern. This helps reduce water runoff that is typically due to irrigating faster than the ground can absorb the water.

Figure 5:
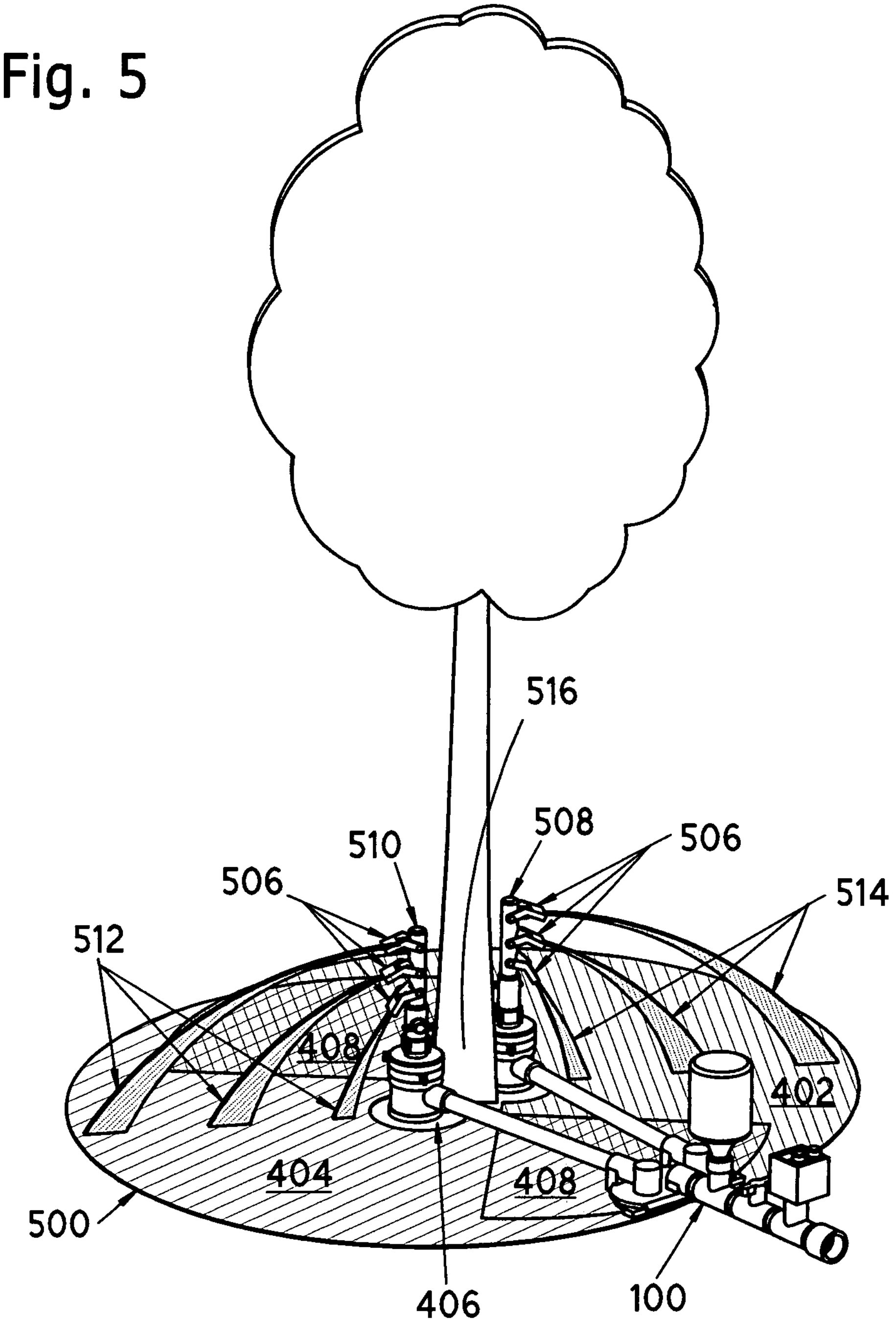
FIG. 5 is a perspective view of the adjustable sprinkler system of the present invention as applied to the irrigation of a small tree.

FIG. 5 is a perspective view of Adjustable Sprinkler System 100 of the present invention as applied to the irrigation of a newly planted tree. With newly planted trees, most of the root system has been removed when the tree was extracted from the ground at the nursery. Because of this, it is desirable to irrigate very close to the base of the tree and then have the spray pattern extend outside the root ball. Extending water outside the root ball encourages roots to move out into the existing soil helping to reestablish the root system that was removed from the tree when extracted from the ground at the nursery.

As shown in FIG. 5, Adjustable Sprinkler System 100 is placed near the newly planted Small Tree Base 516 with First Alternate Spray Head 508 and Second Alternate Spray Head 510 are placed very close and on opposite sides of Small Tree Base 516. First Alternate Spray Head 508 and Second Alternate Spray Head 510 each have Water Nozzle Deflectors 506 attached above each nozzles to direct the water more downward when creating First Alternative Spray Pattern 514 and Second Alternate Spray Pattern 512. The resultant Small Tree Irrigation Pattern 500 is considerably smaller than Large Tree irrigation Pattern 400 shown in FIG. 4 and No Irrigation Zone 406 is very minimal. Again, this keeps the water closer to the root ball so that water soaks into the ground to feed the tree with water while the spray also extends past the root ball to encourage development of the root system.

As a small tree such as that shown in FIG. 5 matures and its root system develops, Adjustable Sprinkler System 100 will be incrementally adjusted to move First Alternate Spray Head 508 and Second Alternate Spray Head 510 away from Small Tree Base 516. Water Nozzle Deflectors 506 may also require adjustment as they are hingably attached at each nozzle and may be adjusted upward so that Small Tree Irrigation Pattern 500 begins to expand along with No Irrigation Zone 406. As the tree and root system grows the watering pattern can also be extended by increasing the water flow. When the tree becomes large enough, a different interchangeable spray head can be used that is more suited for a larger spray pattern, such as shown in FIG. 4.

Figure 6:
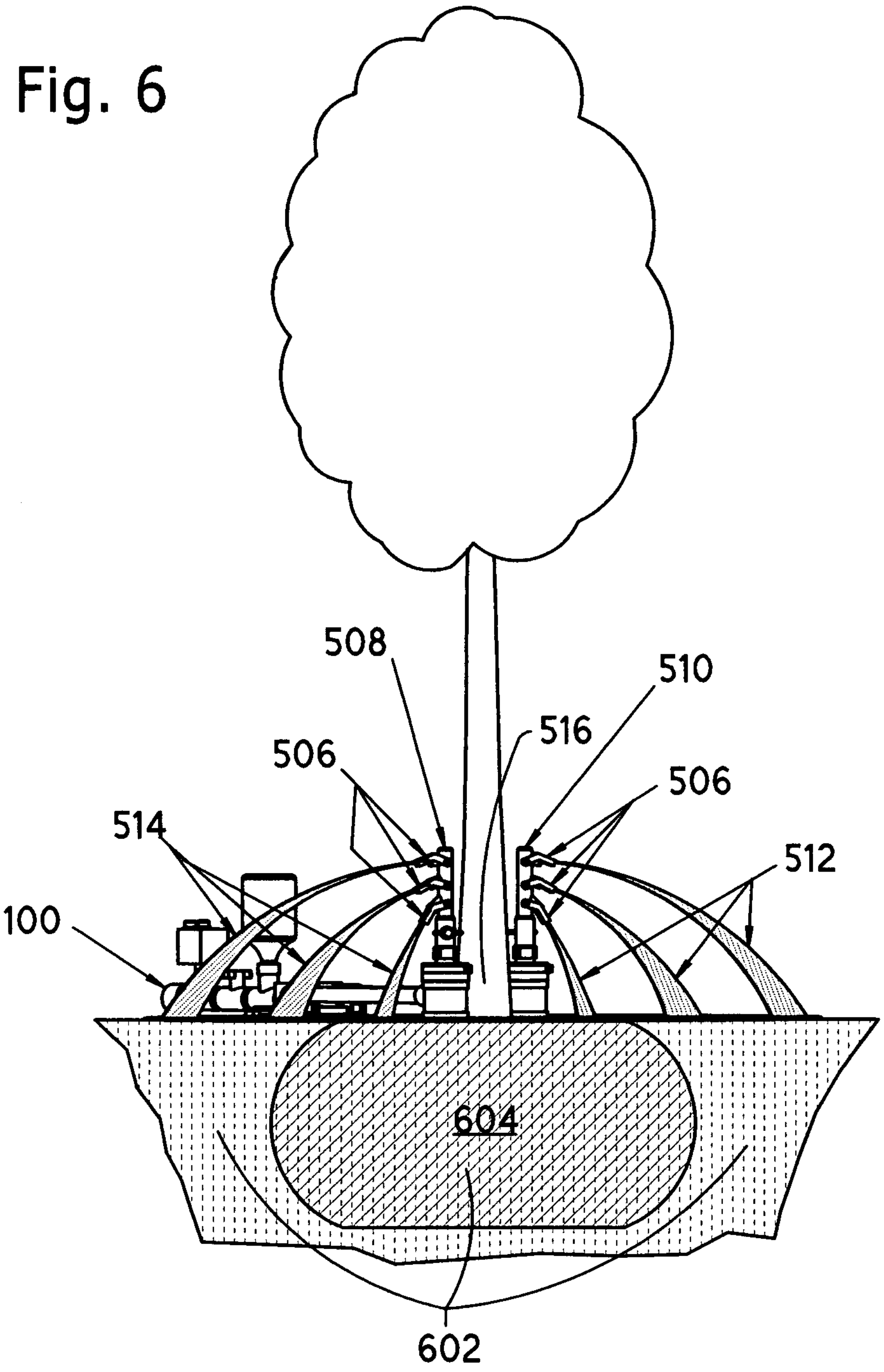
FIG. 6 is a front elevation view of a newly planted tree being watered by the adjustable sprinkler system of the present invention detailing the resulting below ground irrigation.

FIG. 6 is a front elevation view of a small tree being watered by Adjustable Sprinkler System 100 of the present invention detailing the resulting below ground Irrigation Area 602. As previously discussed, Root Ball 604 is relatively small with the majority of it lying directly below Small Tree Base 516. FIG. 6 illustrates an ideal irrigation scheme for a new or small tree where First Alternate Spray Pattern 514 and Second Alternate Spray Pattern 512 irrigate very close to Root Ball 604 while extending slightly outside Root Ball 604 encouraging roots to move outward and into the existing soil. This type of irrigation scheme helps to restore the root system that was removed from the tree when extracted from the ground at the nursery and ultimately promotes growth of the tree.

Figure 7:
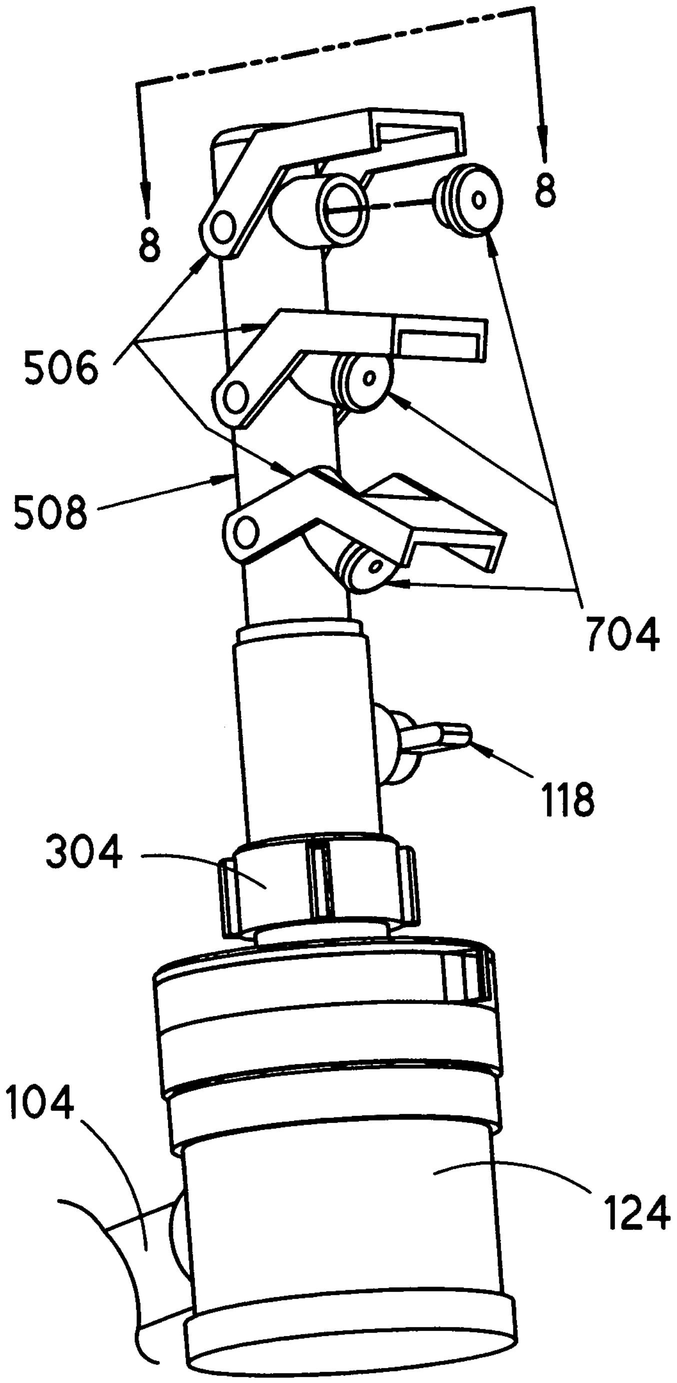
FIG. 7 is a perspective view of an alternate embodiment of a sprinkler head of the present invention depicting alternate spray nozzles.
Figure 8:
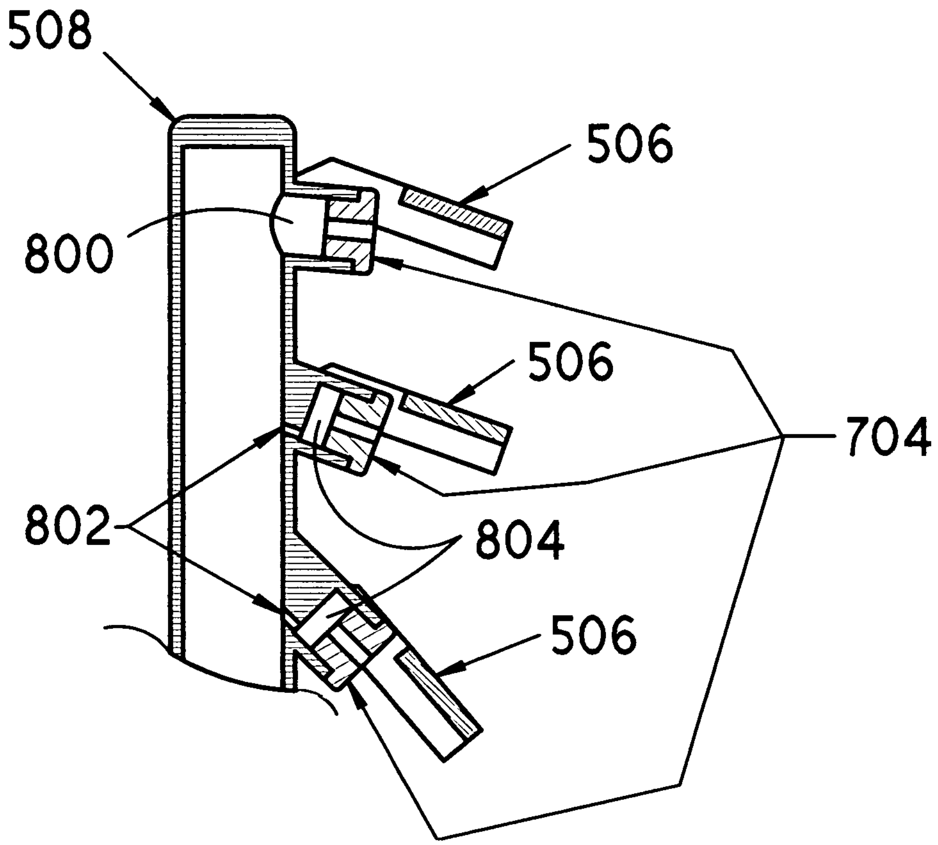
FIG. 8 is a cross-sectional view taken at lines 8-8 in FIG. 7.

FIG. 7 is a perspective view of an alternate embodiment of a sprinkler head of the present invention depicting alternate spray nozzles, deflectors and offset water velocity reduction ports (shown in FIG. 8). In this embodiment, rather than replace First Spray Head 108 if nozzles are damaged or to alter the spray pattern or water flow volume, replaceable Nozzle Inserts 704 are used. Water Nozzle Deflectors 506 are used to deflect water downward when watering newly planted trees, shrubs, or plants so that water reaches the limited root system contained within the small root ball. Spray heads such as Alternate 1st Spray Head 508 and 2nd Alternate Spray Head 510 are also designed with low water flow/volume nozzles to prevent over irrigation in a confined area minimizing water waste.

FIG. 8 is a cross-sectional view taken at lines 8-8 in FIG. 7. FIG. 8 shows Open Water Feed Port 800 and Offset Water Velocity Reduction Feed Port 802. Open Water Feed Port 800 is designed not to restrict water flow to its corresponding Nozzle Inserts 704. The inside diameter of the inserts port will control the water volume flow. The Offset Water Velocity Reduction Feed Port 802 is designed to reduce the spray force out of the nozzle. This is accomplished by the diameter of Offset Water Velocity Reduction Feed Port 802 being smaller than the port diameter of Nozzle Inserts 704. Water flows up the inside of Alternate 1st Spray Head 508 and flows into the port of the Offset Water Velocity Reduction Feed 802 and then into the Water Chamber 804. As the tiny chamber fills, it flows out the larger port of the Nozzle Insert 704. Because the Nozzle Insert 704 port is larger in diameter than the port of the Water Velocity Reduction Feed 802 port the water comes out of the Nozzle Insert 704 port at a slower velocity. This allows water to fall near the base of the sprinkler unit without the use of a Water Nozzle Deflector 506. It can also reduce the force of the spray so that the water does not hit the ground at a velocity that displaces the dirt causing a trench or grass to fold over. In FIG. 8, Open Water Feed Port 800 and the two Offset Water Velocity Reduction Feed Port 802 combine to give an optimum spray pattern to the plant that both projects and sprays downward.

Figure 9:
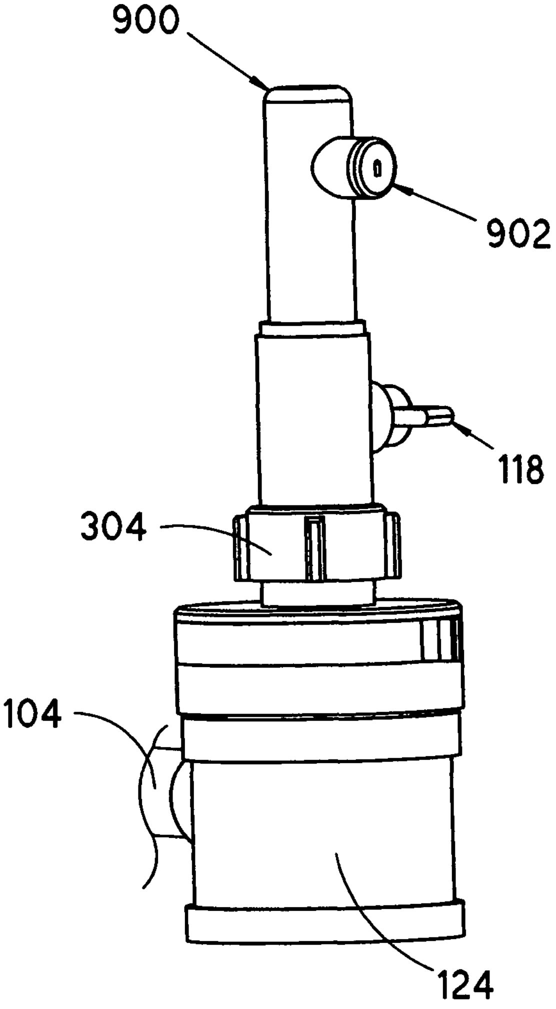
FIG. 9 is a perspective view of an alternate embodiment of a spray head of the present invention.

FIG. 9 is a perspective view of a second alternate embodiment of a spray head of the present invention. The 2nd Alternate Spray Head 900 allows the user to have a spray pattern that waters very similar to a rotary lawn sprinkler. One of the main objectives of this product is to give the user as many Spray Head options as possible so that whatever need they have they can purchase a Spray Head that will do the job.

Figure 10:
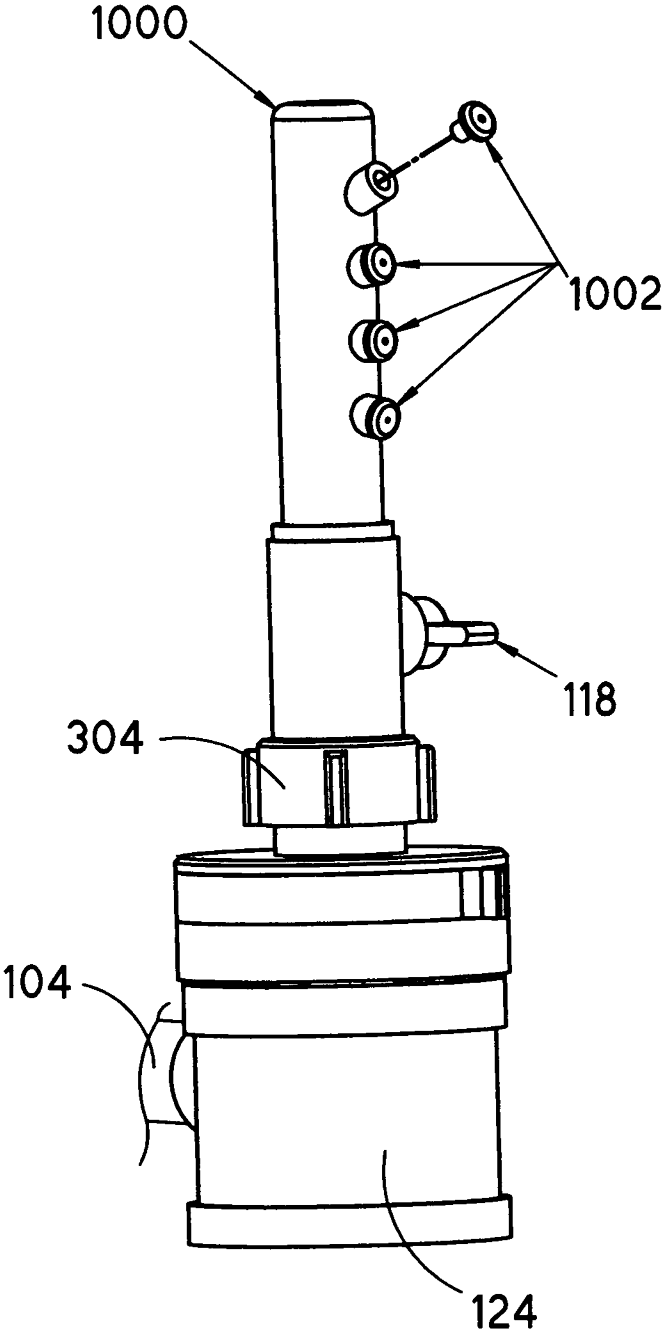
FIG. 10 is a perspective view of another alternate embodiment of a spray head of the present invention.

FIG. 10 is a perspective view of a third alternate embodiment of a spray head of the present invention. The 3rd Alternate Spray Head 1000 shows another option to the user. It contains Non-Offset Nozzle Inserts 1002 that allow the user some flexibility to change out the nozzle if it is plugged or the user wishes to have a different spray pattern or water volume.

Figure 11:
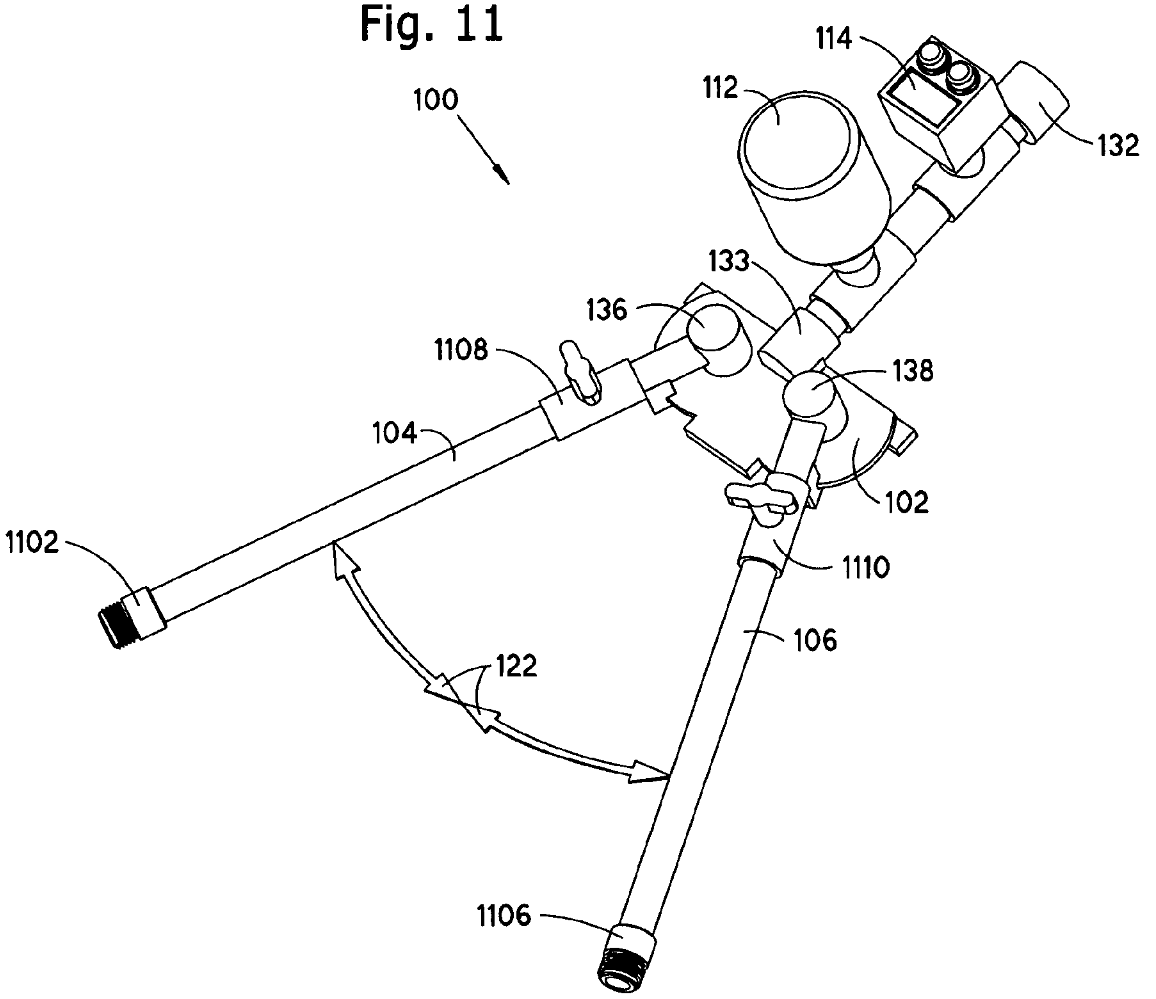
FIG. 11 is a perspective of an alternate adjustable sprinkler system of the present invention.

FIG. 11 is an alternate embodiment of the present invention with the ends of First Arm 104 and Second Arm 106 having an attached First Universal Fitting 1102 and Second Universal Fitting 1106, respectively. On their extreme ends, First Universal Fitting 1102 and Second Universal Fitting 1106 have a common threaded fitting found on most garden hoses. In this configuration, any sprinkler unit attachable to a common garden hose is an option for the system. For example, a rotary sprinkler, an oscillating sprinkler or a low volume sprinkler unit. As previously discussed, RainBird® makes an array of low volume drip/sprinkler systems that are attachable to a garden hose or a fitting such as Universal Hose Fitting 1102. The RainBird® systems and other low volume drip/sprinkler systems have a variety of emission devices or spray heads such as full/half/quarter circle, strip patterns, and the like. Although typically these units are on a long length of thin, plastic tubing, a short section of tubing with the desired spray head is easily attached to First Universal Fitting 1102 and Second Universal Fitting 1106. These low volume systems are designed for extremely small areas or to water individual plants or shrubs.

In the case of a tree, a low volume system such a RainBird® drip/sprinkler system is very useful during the youth of the tree. As the tree matures and a larger watering pattern is needed, a more versatile sprinkler unit such as First Sprinkler Unit 124 and Second Sprinkler Unit 126 shown in FIG. 1 and previously discussed is easily attached.

First Arm Shutoff 1108 and Second Arm Shutoff 1110 are affixed along the length of First Arm 104 and Second Arm 106 for varying or shutting off the flow of water to either or both First Arm 104 and Second Arm 106.

Wherein the terms and expressions which have been employed in the foregoing specification are used therein as terms of description and not of limitation, there is no intention, in the use of such terms and expressions, of excluding equivalents of the features shown and described or portions thereof, it being recognized that the scope of the invention is defined and limited only by the claims which follow.

I claim:

1. An adjustable sprinkler system for applying a spray pattern of water to a plant having a size and a root ball, the sprinkler system having a hose fitting, comprising:

a water feed housing having a top surface, a bottom surface, and a water channel disposed between said top surface and said bottom surface having a water input port in fluid communication with the hose fitting, said water channel bifurcates into a first pivot arm feed channel and a second pivot arm feed channel;

a first pivot arm support pivotally attached to said top surface of said water feed housing and in fluid communication with said first pivot arm feed channel;

a second pivot arm support pivotally attached to said top surface of said water feed housing and in fluid communication with said second pivot arm feed channel;

a first arm fixedly attached to said first pivot arm support and extending from and essentially parallel to said water feed housing, said first arm having a first sprinkler unit attached to a first arm end opposite said water feed housing; and a second arm fixedly attached to said second pivot arm support and extending from and essentially parallel to said water feed housing, said second arm having a second sprinkler unit attached to a second arm end opposite said water feed housing;

wherein, said first sprinkler unit and said second sprinkler unit are in fluid communication with the hose fitting such that a garden hose attached to the hose fitting expels a stream of water through the hose fitting, through said water feed housing, through said first arm feed channel and said second arm feed channel, through said first arm and said second arm, and through said first sprinkler unit and said second sprinkler unit, said first arm and said second arm pivot at said first pivot arm support and said second pivot arm support respectively from said top surface of said water feed housing creating a variable adjustment angle between said first arm and said second arm allowing the desired placement of said first sprinkler unit and said second sprinkler unit around the plant such that the spray pattern of water does not contact the plant while applying water approximate the root ball of the plant thereby essentially eliminating over watering and water waste.

2. The adjustable sprinkler system of claim 1, further comprising a main flow control disposed between the hose fitting and said water input port, wherein said main flow control is adjustable to control said stream of water expelled to said water feed housing.

3. The adjustable sprinkler system of claim 2, further comprising a fertilizer dispenser for dispensing a quantity of fertilizer having an opening in fluid communication with the hose fitting disposed between said main flow control and said water input port such that as said stream of water passes by said opening said quantity of fertilizer enters said stream of water.

4. The adjustable sprinkler system of claim 1, further comprising:

a first spray head having at least one nozzle removeably attached to said first sprinkler unit and essentially perpendicular to said first arm; and a second spray head having at least one said nozzle removeably attached to said second sprinkler unit and essentially perpendicular to said second arm;

wherein, said first spray head and said second spray head are independently selected to apply the spray pattern of water necessary to the root ball of the plant based on the size of the plant.

5. The adjustable sprinkler system of claim 4, further comprising:

a first head flow adjustment for adjusting said stream of water to said first spray head disposed between said first sprinkler unit and said first spray head; and a second head flow adjustment for adjusting said stream of water to said second spray head disposed between said second sprinkler unit and said second spray head, wherein, said first head flow adjustment and said second head flow adjustment are adjusted to increase or decrease said stream of water thereby providing said spray pattern of water needed by the plant.

6. The adjustable sprinkler system of claim 4, further comprising:

a pair of first adjustable zone stops disposed around and slideably attached to said first sprinkler unit; and a pair of second adjustable zone stops disposed around and slideably attached to said second sprinkler unit;

wherein, said first adjustable zone stops control a first spray pattern of water such that when said first adjustable zone stops are slid proximate one another said first spray pattern of water is narrow, when said first adjustable zone stops are slid away from one another said first spray pattern of water is wide, and said second adjustable zone stops control a second spray pattern of water such that when said second adjustable zone stops are slid proximate one another said second spray pattern of water is narrow, when said second adjustable zone stops are slid away from one another said second spray pattern of water is wide, wherein said first spray pattern of water and said second spray pattern of water surround the plant and the root ball is adequately watered while minimizing over watering.

7. The adjustable sprinkler system of claim 1, further comprising:

a first arm flow control disposed between said water feed housing and said first sprinkler unit for adjusting said stream of water to said first sprinkler unit; and a second arm flow control disposed between said water feed housing and said second sprinkler unit for adjusting said stream of water to said second sprinkler unit.

8. The adjustable sprinkler system of claim 1, further comprising:

a first universal fitting fixedly attached at a first fitting end to said first arm end and a first fitting threaded end opposite said first fitting end; and a second universal fitting fixedly attached at a second fitting end to said second arm end and a second fitting threaded end opposite said second fitting end;

wherein, said first sprinkler unit is screwed onto said first fitting threaded end and said second sprinkler unit is screwed onto said second fitting end providing the spray pattern of water to the root ball of the plant based on the size of the plant.

9. The adjustable sprinkler system of claim 8, wherein said first sprinkler unit and said second sprinkler unit are oscillating sprinklers.

10. The adjustable sprinkler system of claim 8, wherein said first sprinkler unit and said second sprinkler unit are rotary sprinklers.

11. An adjustable sprinkler system for applying a spray pattern of water to a plant having a size and a root ball, the sprinkler system having a hose fitting, comprising:

a water feed housing having a top surface, a bottom surface, and a water channel having a water input port in fluid communication with the hose fitting, said water channel bifurcates into a first pivot arm feed channel and a second pivot arm feed channel;

a first pivot arm support pivotally attached to said top surface of said water feed housing and in fluid communication with said first pivot arm feed channel;

a second pivot arm support pivotally attached to said top surface of said water feed housing and in fluid communication with said second pivot arm feed channel;

a first arm fixedly attached to said first pivot arm support and extending from and essentially parallel to said water feed housing, said first arm having a first sprinkler unit attached to a first arm end opposite said water feed housing;

a second arm fixedly attached to said second pivot arm support and extending from and essentially parallel to said water feed housing, said second arm having a second sprinkler unit attached to a second arm end opposite said water feed housing;

a first spray head having at least one nozzle and removeably attached to said first sprinkler unit; and a second spray head having at least one said nozzle and removeably attached to said second sprinkler;

wherein, said first spray head and said second spray head are in fluid communication with the hose fitting such that a garden hose attached to the hose fitting expels a stream of water through the hose fitting, through said water feed housing, through said first arm feed channel and said second arm feed channel, through said first arm and said second arm, and through said first sprinkler unit to said first spray head and said second sprinkler unit to said second spray head, said first arm and said second arm pivot at said first pivot arm support and said second pivot arm support respectively from said top surface of said water feed housing creating a variable adjustment angle between said first arm and said second arm thereby placing said first sprinkler unit and said second sprinkler unit around the plant such that the spray pattern of water does not contact the plant while applying the spray pattern of water approximate the root ball of the plant thereby essentially eliminating over watering and water waste.

12. The adjustable sprinkler system of claim 11, further comprising:

a first head flow adjustment for adjusting said stream of water to said first spray head disposed between said first sprinkler unit and said first spray head; and a second head flow adjustment for adjusting said stream of water to said second spray head disposed between said second sprinkler unit and said second spray head, wherein, said first head flow adjustment and said second said flow adjustment are adjusted to increase or decrease said stream of water thereby providing said spray pattern of water optimal for the plant.

13. The adjustable sprinkler system of claim 11, further comprising:

a nozzle deflector pivotally attached to said first spray head and above each of said at least one nozzle, such that said nozzle deflector is pivoted to direct said spray pattern of water from said nozzle upward or downward.

14. The adjustable sprinkler system of claim 11, further comprising:

a nozzle deflector pivotally attached to said second spray head and above each of said at least one nozzle, such that said nozzle deflector is pivoted to direct said spray pattern of water from said nozzle upward or downward.

15. The adjustable sprinkler system of claim 11, wherein said at least one nozzle has a removable nozzle insert such that each of said at least one nozzle is independently selected to provide a specific pattern to said spray pattern of water.

16. The adjustable sprinkler system of claim 11, further comprising:

at least one open water feed port disposed in said at least one nozzle and in fluid communication with said first spray head; and at least one offset water velocity reduction feed port disposed in said at least one nozzle and in fluid communication with said first spray head;

wherein, said open water feed port contributes a first volume of spray to said spray pattern of water, while said offset water velocity reduction feed port contributes a reduced volume of spray to said spray pattern of water, said first volume of spray projects a first portion of said spray pattern away from the plant and said reduced volume of spray projects a second portion of said spray pattern of water near the plant with less force than said first portion, wherein said first portion and said second portion combine to optimize said spray pattern of water for the plant while minimizing damage to the plant and an area surrounding the plant.

17. The adjustable sprinkler system of claim 11, further comprising:

at least one open water feed port disposed in said at least one nozzle and in fluid communication with said second spray head; and at least one offset water velocity reduction feed port disposed in said at least one nozzle and in fluid communication with said second spray head;

wherein, said open water feed port contributes a first volume of spray to said spray pattern of water, while said offset water velocity reduction feed port contributes a reduced volume of spray to said spray pattern of water, said first volume of spray projects a first portion of said spray pattern away from the plant and said reduced volume of spray projects a second portion of said spray pattern of water near the plant with less force than said first portion, wherein said first portion and said second portion combine to optimize said spray pattern of water for the plant while minimizing damage to the plant and an area surrounding the plant.

* * * * *